Sept. 3, 1957 — O. B. RIPPERDAN — 2,804,717
LONGITUDINALLY ADJUSTABLE FISHING LEADER HOLDER
Filed June 15, 1954
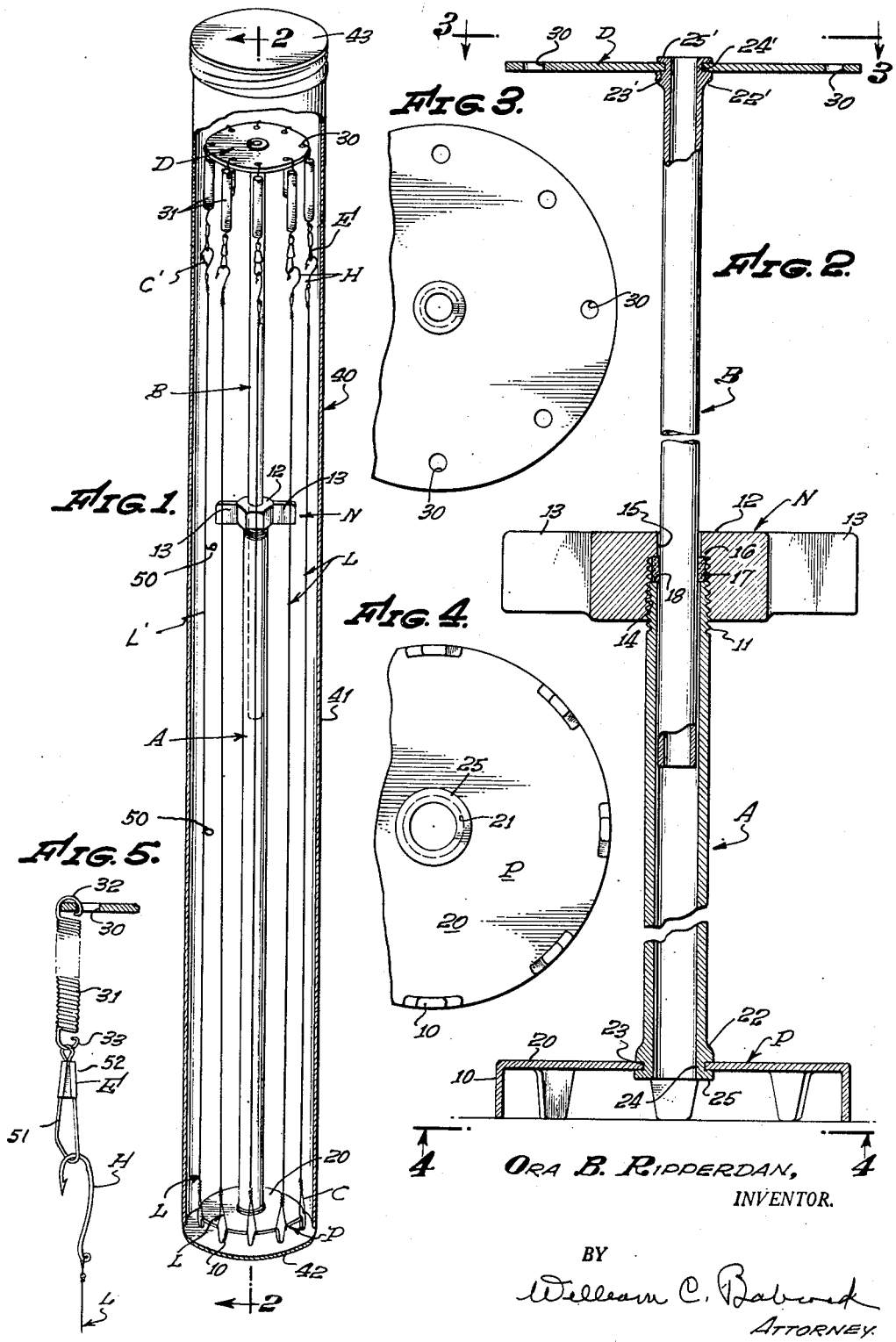
ORA B. RIPPERDAN,
INVENTOR.
BY William C. Babcock
ATTORNEY.

United States Patent Office 2,804,717
Patented Sept. 3, 1957

2,804,717

LONGITUDINALLY ADJUSTABLE FISHING LEADER HOLDER

Ora B. Ripperdan, Long Beach, Calif.

Application June 15, 1954, Serial No. 436,760

1 Claim. (Cl. 43—57.5)

The present invention relates generally to fishing accessories, and more particularly to a fishing leader holder capable of being longitudinally adjusted to substantially the length of the leaders desired to be supported in straight, parallel positions thereon and laterally separated from one another.

Although various forms of fishing leader holders have been devised and marketed in the past, one or more inherent operational disadvantages have been present in such devices whereby their widespread adoption and use is restricted. A leader holder performs a number of most important functions for the sportsman. It must not only be lightweight and portable, but must be of such structure and design as to permit leaders to be easily mounted on or removed therefrom with a minimum of time and effort. In addition, and of paramount importance, the leaders must be supported on the holder in straight positions, for when gut leaders are mounted on a curved holder they assume the curved configuration thereof as they dry, and from twenty minutes to one-half hour are sometimes required in the use of a holder of this type in soaking the dry leaders to eliminate the curvature acquired therefrom. If gut leaders are not soaked to remove such acquired curvature, they will tend to assume a somewhat helix shape when cast into a stream or body of water. When a leader having such a spiral configuration is put into the water it will not give satisfactory service, for if the bait or lure supported therefrom is taken by a large fish, the leader has a tendency to kink when the sudden force applied thereto by the fish pulls it straight. If kinking in a fish leader occurs, the material from which it is fabricated is definitely weakened internally at the kinked portion, and will not stand the stress and strain applied to the leader by the violent struggles and leaps of a hooked fish in an effort to regain its freedom.

Before using a steel leader that has been wound on a curved holder even more care is required than when a gut leader of comparable weight and length is employed. A dry gut leader that has acquired a spiral curvature will ultimately become most pliable after proper soaking, but such is not the case with a steel leader. A steel leader, previously mounted on a curved holder, must be carefully straightented by hand prior to use, and it will be readily apparent that this can be a most difficult operation if the sportsman is standing or sitting in a precarious position or fishing from a small boat.

In addition to the desirability of having straight leaders available for successful fishing, it is also necessary that they be maintained in this position by a holder which is adjustable to leaders of varying lengths, for due to the pecularities of different fish, the geographical environment in which the fish are found, as well as the individual preferences of fishermen, there is no standard leader length.

Furthermore, the leader holder must not only meet the above-mentioned requirements, but it must be so designed as to permit immediate removal of the leader therefrom.

The primary purpose in devising the present invention is to provide a fishing leader holder that will conform to the above requirements in supplying a stock of straight leaders which will be protectively maintained in readily accessible positions, and one that will overcome the operational disadvantages of previously available leader holders deficient in meeting all of these requirements.

A major object of the invention is to supply an elongated fishing leader holder of elongate shape which may be longitudinally adjusted whereby leaders of the desired length may be removably mounted thereon, and which will maintain leaders so mounted in straight, parallel, laterally separated positions, which holder is of such size and shape that it may be easily inserted within, or removed from the confines of a rigid protective tubular container that minimizes the possibility of damage to the holder and leaders during transportation to or from a fishing site.

These and other objects and advantages of the invention will become apparent from the following description of a preferred form thereof, and from the drawing illustrating that form in which:

Figure 1 is a perspective view of the leader holder shown disposed in an elongate cylindrical container shown partially in section, on one end of which a screw cap is mounted;

Figure 2 is an enlarged vertical partial cross-sectional view of the leader holder per se taken on line 2—2 of Figure 1;

Figure 3 is a partial plan view of the rigid plate of the invention that supports the hook engageable portions thereof, taken on line 3—3 of Figure 2;

Figure 4 is a partial plan view of the loop engageable portion of the device taken on line 4—4 of Figure 2; and Figure 5 is an enlarged elevational detail view of one of the spring-loaded hook engageable members that are adapted to depend downwardly from the plate shown in Figure 2.

Referring now to the drawing the holder per se includes a first elongate tubular member A which is telescopically engaged over a second tubular member B. The two members A and B are adapted to be locked in fixed relationship by a wing nut N, as may be seen in Figures 1 and 2.

Member A supports a first annular toothed plate P adjacent the free end thereof, the function of which is to removably support the loops C of a fishing leader L. The member B has a second annular plate D mounted adjacent the free end thereof and a number of circumferentially spaced spring-loaded loops E depend from this plate. Each of the spring-loaded loops E is adapted to be removably engaged by a hook H of a leader when the loop C of that particular leader is in engagement with plate P. In order that the leaders L will be equally spaced from one another for easy mounting and removal thereof from the holder, plate P is formed with a number of loop engageable teeth 10 that are circumferentially spaced thereon, and in vertical alignment with the spring-loaded loops E which are on the same circumferential spacing relative to plate D.

The tubular member A is formed from a rigid material, preferably one that will not tarnish, discolor or corrode when exposed to water, whether fresh or salt. The same type of material is preferably used in the fabrication of member B. Although it is desirable to employ a material embodying the above mentioned physical characteristics in the fabrication of members A and B, it is not essential for suitable protective compounds may be applied to such materials subject to corrosion. It will also be apparent that any metals used in fabricating members A and B which might be subject to corrosion may be protected from the action of water or moisture by means of plating or a coating that is inert to such corrosion.

Member A is formed with an externally threaded free end portion 11. Nut N has a centrally disposed hub portion 12 from which two manually engageable wings 13 project outwardly in opposing directions. A centrally disposed tapped bore 14 is formed in the hub portion 12 so as to permit threaded engagement with the threaded end portion 11 of member A, and a coaxial counterbore 15 smaller in diameter than that of bore 14 is provided in hub portion 12 to define an annular shaped body shoulder 16 at the junction thereof within the confines of hub portion 12.

A resilient washer 17 of rubber or the like is so positioned within the upper confines of bore 14 that the lower face of the washer abuts against the upper edge surface 18 of member A whereby the upper surface of the washer will engage body shoulder 16. When the wing nut N is rotated to move downwardly on member A, washer 17 is compressed between the body shoulder and the upper body surface 17 of that member. Compression of the washer 17 is distributed therethrough whereby the size of the internal diameter of the washer is reduced, causing it to tightly grip the exterior face of member B and prevent movement of this member relative to member A after longitudinal and angular adjustment of the two members with regard to the length of the particular leaders L to be supported on the holder.

Plate P is preferably fabricated as an integral unit from a suitable rigid material and includes a circular sheet 20 from which the loop engageable teeth 10 project, which sheet 20 has a central bore 21 formed therein. The lower end portion of member A is slightly flared outwardly through a portion 22 thereof, and horizontally positioned annular shaped body shoulder 23 is defined on the lower extremity of portion 22 at the junction thereof with a tubular neck 24 smaller in diameter than bore 21. Plate P is rigidly mounted on one end of member A as the neck 24 prevents lateral movement thereof, and vertical movement of this plate is prevented by the cooperative gripping action of body shoulder 23 and flange 25. Flange 25 may be rigidly affixed to tubular member A by any one of conventional means, or may be by a separate member mounted on member A.

Plate D is affixed to the free end portion of tubular member B in the same manner as plate P is mounted on member A. Therefore, the same identifying numerals are used in the description of plate D and the mounting thereof on member B as employed in the description of plate D and the mounting thereof on member B as employed in the description of the elements connecting plate P to member D. However, the identifying numerals used relative to the mounting components of plate D on member B have been distinguished by affixing a prime thereto.

A number of circumferentially spaced apertures 30 are formed in plate D, and a number of helical springs 31 are provided, and hooks 32 and 33 are formed on the extremities thereof. Due to the fact that hooks 32 are engageable in the apertures and outer edge portions of plate D (Figures 1 and 5), the springs 31 may extend downwardly from the plate. Hooks 32 support the downwardly extending rigid loops E of conventional design that may be removably engaged by the hooks H of the leaders L.

The leader holder above described is preferably carried to and from a fishing site in a rigid cylindrical container 40 defined by a tubular peripheral wall 41, bottom 42, and top 43, which top is adapted to be screwed or otherwise removably affixed to the open end portion of the container. The internal height of container C is sufficient to accommodate the leader holder when expanded, to support leaders L of maximum length.

In use, members A and B are longitudinally adjusted to a position in which plate P and the spring-loaded loops E are separated by a distance slightly greater than that of the leaders to be supported thereby. When the wing nut N is rotated in the proper direction, the resilient washer 17 is compressed against the exterior surface of member B whereby members A and B are locked in fixed relationship.

Leaders L may then be removably mounted on the invention by causing the hooks H to engage loops E, and exert downward force on the leaders to stretch the springs and permit loops C to slip over the teeth 10, as shown in Figure 1. The leaders are maintained in taut, straight position on the holder due to the force exerted thereon by the springs which are under tension.

It is sometimes advantageous to use either a single leader L' or two leaders coupled together that have loops C on the free ends thereof. Normally, such a leader will have longitudinally spaced eyes 50 formed therein, as seen in Figure 1, which serve to removably affix snells to the leader. The leader may be removably supported on the holder by causing a loop C to engage a tooth 10 and engaging the other end of the leader by the loop E shown in detail in Figure 5. This latter loop E is of a commercially available type, and includes a generally U-shaped resilient wire portion 51, the free end of which may be removably positioned in a suitably slotted member 52 when it is desired to rigidly position the loop.

Although the leader holder herein described is fully capable of achieving the objects and providing the advantages above mentioned, it is to be understood that it is merely the presently preferred embodiment of the invention and that there is no intention to limit it to the details of construction other than as defined in the appended claim.

I claim:

A longitudinally adjustable holder for a plurality of fishing leaders, each leader of which includes a loop and a hook that may be removably disposed in a protected position in a cylindrical carrying case, comprising: a first tubular member having external threads formed on a first end portion thereof; a second tubular member telescopically mounted in said first member; a first circular plate of such diameter as to fit inside said case mounted on a second end portion of said first member, which first plate has a plurality of circumferentially spaced loop-engageable prongs extending therefrom and substantially parallel to said first member; a second circular plate of substantially the same diameter as said first plate mounted on a second end portion of said second member; a plurality of circumferentially spaced helical springs affixed to said second plate; a plurality of hook-engageable loops carried by the downwardly disposed end portions of said springs; a nut in which a first bore is formed that is in coaxial alignment with a second tapped bore, which bores are in communication with one another and define a circular shoulder at their junction, with said first bore slidably engaging said second tubular member and said second tapped bore engaging said external threads; and a resilient band positioned in said counterbore between said seat and the upper end of said first tubular member, which band is adapted to be compressed to grip said second tubular member and so hold it in a fixed position relative to said second member when said nut is tightened that said leaders of desired lengths can be supported between said prongs and loops, with each of said leaders being removable therefrom by moving the hook affixed thereto upwardly relative to said hook-engageable loops and then downwardly relative to said prongs.

References Cited in the file of this patent

UNITED STATES PATENTS

| | | |
|---|---|---|
| 742,040 | Kurtz | Oct. 20, 1903 |
| 1,451,256 | Gardner | Apr. 10, 1923 |
| 1,490,370 | Figley | Apr. 15, 1924 |
| 2,225,309 | Lawrence | Dec. 17, 1940 |
| 2,658,300 | Snyder | Nov. 10, 1953 |
| 2,667,010 | Anderson | Jan. 26, 1954 |

FOREIGN PATENTS

| | | |
|---|---|---|
| 608,395 | Great Britain | Sept. 15, 1948 |